United States Patent
Zammit-Mangion et al.

(10) Patent No.: US 11,327,508 B2
(45) Date of Patent: May 10, 2022

(54) FAST FLIGHT TRAJECTORY OPTIMISATION FOR IN-FLIGHT COMPUTATION AND FLIGHT MANAGEMENT SYSTEMS

(71) Applicant: University of Malta, Msida (MT)

(72) Inventors: David Zammit-Mangion, Mellieha (MT); Kenneth Chircop, Dingli (MT)

(73) Assignee: University of Malta, Msida (MT)

( * ) Notice: Subject to any disclaimer, the term of this patent is extended or adjusted under 35 U.S.C. 154(b) by 127 days.

(21) Appl. No.: 15/280,000

(22) Filed: Sep. 29, 2016

(65) Prior Publication Data

US 2017/0090482 A1  Mar. 30, 2017

Related U.S. Application Data

(60) Provisional application No. 62/234,241, filed on Sep. 29, 2015.

(51) Int. Cl.
*G05D 1/10* (2006.01)
*H04B 7/185* (2006.01)
(Continued)

(52) U.S. Cl.
CPC .......... *G05D 1/101* (2013.01); *G05D 1/0005* (2013.01); *G06Q 10/047* (2013.01); *G06Q 50/30* (2013.01);
(Continued)

(58) Field of Classification Search
None
See application file for complete search history.

(56) References Cited

U.S. PATENT DOCUMENTS

| | | | | |
|---|---|---|---|---|
| 9,032,319 B1 * | 5/2015 | Hammack | ............ | G06F 3/0486 715/769 |
| 2006/0089760 A1 * | 4/2006 | Love | ............ | G08G 5/0039 701/4 |

(Continued)

FOREIGN PATENT DOCUMENTS

CN  103245257 B  *  1/2015

OTHER PUBLICATIONS

International Preliminary Report on Patentability for International Application No. PCT/IB2016/055840 dated Apr. 12, 2018.
(Continued)

*Primary Examiner* — Donald J Wallace
(74) *Attorney, Agent, or Firm* — Harness, Dickey & Pierce, P.L.C.

(57) ABSTRACT

A system and method of generating optimised aircraft flight trajectories on Flight Management Systems with limited computational power that takes into account developing operational conditions, air traffic constraints and aircraft performance in a timely manner on the flight management system that can allow tactical flight plan changes to be incorporated without unduly introducing operational or financial penalties to the operator. An example method involves parameterisation of optimal trajectories as functions of operational parameters thereby allowing computational systems to use such computed functions in the air to determine the optimal trajectory or flight profile required for the specific operating conditions quickly and accurately.

17 Claims, 13 Drawing Sheets

(51) Int. Cl.
  *G05D 1/00* (2006.01)
  *G08G 5/00* (2006.01)
  *G06Q 10/04* (2012.01)
  *G06Q 50/30* (2012.01)
(52) U.S. Cl.
  CPC ......... *G08G 5/0021* (2013.01); *G08G 5/0026* (2013.01); *G08G 5/0034* (2013.01); *G08G 5/0039* (2013.01); *G08G 5/0047* (2013.01); *H04B 7/18504* (2013.01)

(56) References Cited

U.S. PATENT DOCUMENTS

| | | | |
|---|---|---|---|
| 2007/0057114 A1* | 3/2007 | Boissenin | B64C 19/02 244/75.1 |
| 2012/0191331 A1 | 7/2012 | Torres et al. | |
| 2015/0371544 A1* | 12/2015 | Mere | G08G 5/0039 701/3 |
| 2016/0210865 A1* | 7/2016 | Mizutani | G08G 5/0034 |

OTHER PUBLICATIONS

International Search Report PCT/ISA/210 and Written Opinion of the International Searching Authority PCT/ISA/237 for International Application No. PCT/IB2016/055840 dated Jan. 2, 2017.
CA Office Action for European Patent Application No. 16790693.2 dated Oct. 27, 2020.

* cited by examiner

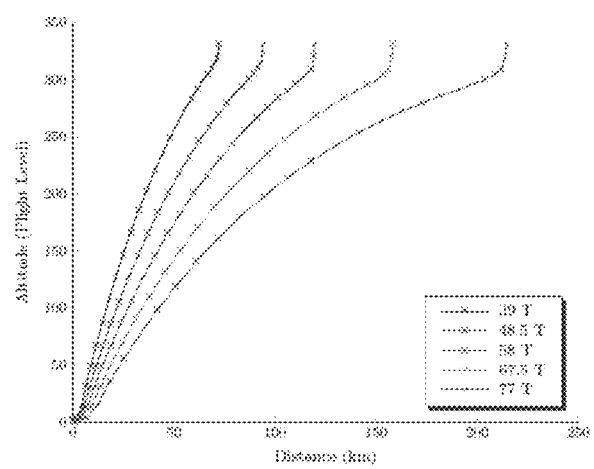 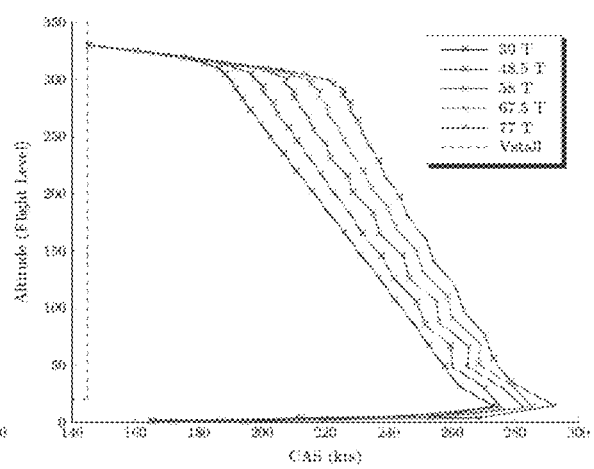
(a) Altitude vs Distance          (b) Altitude vs CAS
FIG. 1(a)          FIG. 1(b)

(c) True Airspeed vs Altitude

| Temp. \ Initial Mass | 39 tonnes | 48.5 tonnes | 58 tonnes | 67.5 tonnes | 77 tonnes |
|---|---|---|---|---|---|
| 0.00°C  $a_{M,T}$ | $-3.43 \times 10^{-5}$ | $2.46 \times 10^{-5}$ | $1.08 \times 10^{-4}$ | $1.97 \times 10^{-4}$ | $2.79 \times 10^{-4}$ |
| $b_{M,T}$ | 0.125 | 0.128 | 0.122 | 0.115 | 0.110 |
| $c_{M,T}$ | 285.79 | 287.79 | 291.55 | 295.5 | 300 |
| 5.63°C  $a_{M,T}$ | $-4.62 \times 10^{-5}$ | $3.17 \times 10^{-5}$ | $1.24 \times 10^{-4}$ | $2.03 \times 10^{-4}$ | $2.77 \times 10^{-4}$ |
| $b_{M,T}$ | 0.134 | 0.130 | 0.122 | 0.120 | 0.119 |
| $c_{M,T}$ | 287.85 | 290.7 | 294.5 | 298.15 | 302.12 |
| 11.25°C  $a_{M,T}$ | $-5.13 \times 10^{-5}$ | $4.04 \times 10^{-5}$ | $1.36 \times 10^{-4}$ | $2.15 \times 10^{-4}$ | $2.89 \times 10^{-4}$ |
| $b_{M,T}$ | 0.140 | 0.131 | 0.122 | 0.120 | 0.121 |
| $c_{M,T}$ | 290.23 | 293.67 | 297.51 | 301.12 | 304.94 |
| 16.88°C  $a_{M,T}$ | $-4.78 \times 10^{-5}$ | $5.63 \times 10^{-5}$ | $1.42 \times 10^{-4}$ | $2.25 \times 10^{-4}$ | $2.98 \times 10^{-4}$ |
| $b_{M,T}$ | 0.142 | 0.129 | 0.124 | 0.123 | 0.125 |
| $c_{M,T}$ | 292.98 | 296.82 | 300.2 | 303.81 | 307.48 |
| 22.50°C  $a_{M,T}$ | $-3.65 \times 10^{-5}$ | $5.31 \times 10^{-5}$ | $1.61 \times 10^{-4}$ | $2.33 \times 10^{-4}$ | $3.1 \times 10^{-4}$ |
| $b_{M,T}$ | 0.142 | 0.135 | 0.122 | 0.125 | 0.126 |
| $c_{M,T}$ | 295.96 | 299.11 | 303.45 | 306.57 | 310.35 |
| 28.13°C  $a_{M,T}$ | $-2.07 \times 10^{-5}$ | $7.08 \times 10^{-5}$ | $1.54 \times 10^{-4}$ | $2.53 \times 10^{-4}$ | $3.21 \times 10^{-4}$ |
| $b_{M,T}$ | 0.140 | 0.134 | 0.133 | 0.125 | 0.131 |
| $c_{M,T}$ | 295.48 | 298.73 | 301.86 | 306.35 | 309.85 |
| 33.75°C  $a_{M,T}$ | $-3.43 \times 10^{-6}$ | $1.04 \times 10^{-4}$ | $1.97 \times 10^{-4}$ | $2.81 \times 10^{-4}$ | $3.52 \times 10^{-4}$ |
| $b_{M,T}$ | 0.140 | 0.128 | 0.124 | 0.124 | 0.128 |
| $c_{M,T}$ | 291.95 | 295.95 | 299.6 | 303.69 | 307.77 |
| 39.38°C  $a_{M,T}$ | $1.81 \times 10^{-5}$ | $1.24 \times 10^{-4}$ | $2.23 \times 10^{-4}$ | $3.11 \times 10^{-4}$ | no conv |
| $b_{M,T}$ | 0.138 | 0.128 | 0.123 | 0.121 | no conv |
| $c_{M,T}$ | 288.22 | 292.34 | 296.59 | 301.13 | no conv |
| 45.00°C  $a_{M,T}$ | $4.52 \times 10^{-5}$ | $1.51 \times 10^{-4}$ | $2.45 \times 10^{-4}$ | $3.64 \times 10^{-4}$ | no conv |
| $b_{M,T}$ | 0.134 | 0.126 | 0.123 | 0.108 | no conv |
| $c_{M,T}$ | 284.48 | 288.67 | 293.11 | 299.56 | no conv |

FIG. 3

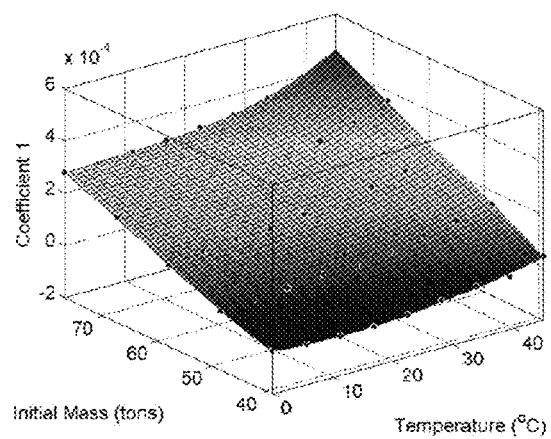
(a) $a_{M,T}$
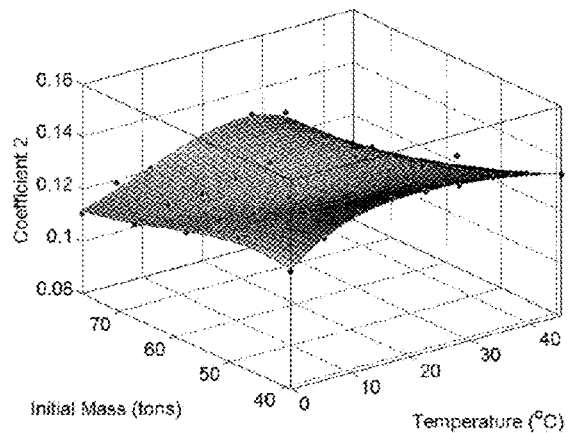
(b) $b_{M,T}$
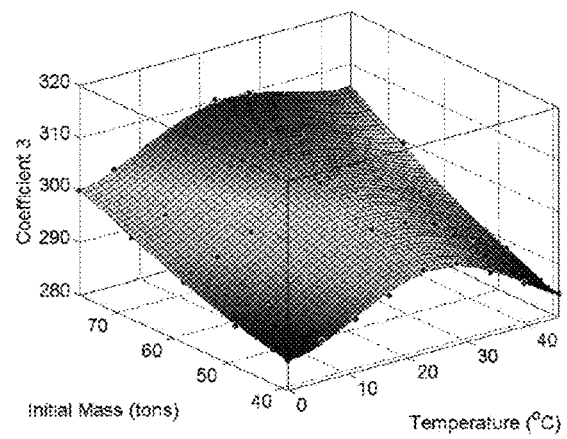
(c) $c_{M,T}$
FIG. 4

FAST FLIGHT TRAJECTORY OPTIMISATION FOR IN-FLIGHT COMPUTATION AND FLIGHT MANAGEMENT SYSTEMS

FIELD OF THE INVENTION

The present invention relates to a system and method of generating optimised aircraft flight trajectories on Flight Management Systems with limited computational power.

BACKGROUND OF THE INVENTION

The operation of current commercial aircraft is highly automated, with the mission and trajectories flown being managed by a Flight Management System (FMS). Consequently, FMSs are programmed with flight plans, one of which will be chosen, adapted or input directly by the crew to be flown by the aircraft for the particular mission. The flight plans will normally have been designed in a manner to be advantageous to the aircraft operator from an economic perspective. Parameters such as climb, cruise and descent speeds as well as operating altitudes define the time of flight and fuel burn on the particular mission and these parameters are usually selected according to operational costs and other constraints (such as aircraft scheduling) in order to accommodate the aircraft operator's interests and needs. The flight plan will normally be submitted to the relevant Air Navigation Service Provider (ANSP) and is agreed upon prior to the start of the mission.

An aircraft, however, rarely flies according to the submitted and agreed upon flight plan without any alterations. This is because tactical variations from the flight plan invariably occur. Such variations may include operational delays, aircraft operating weight, winds and air traffic constraints. Factors such as delays, weight and winds normally affect the vertical profile of a flight plan, resulting in changes in air speed, ground speed and altitude, whilst air traffic and weather constraints often also result in lateral deviations.

Tactical deviations from the flight plan usually result in a penalty in terms of fuel burn, emissions and operating costs. Penalties also arise from limitations in current technology and procedure that preclude the operator from then selecting an optimal flight plan for the new constraints caused by the said tactical deviations.

Airline operators often use what is referred to as the Cost Index (CI) to establish the operating speeds (and thus trip fuel burn) on a particular mission. The CI is an arbitrary parameter that relates time-related costs with fuel costs. By selecting a particular CI, the FMS will schedule the operating speeds according to the operating weight and reported winds and temperatures entered into the system. The CI is nominally set for a particular flight and not altered during its progress. This, naturally, results in the effective averaging of flight performance to determine the particular operating point.

The CI is a useful tool that allows the operator to select advantageous operating points of the aircraft. However, due to various factors, including processing power limitations in Flight Management Systems as well as corporate practices, the trajectory flown will often not be optimal, resulting in further savings in terms of fuel burn and costs being possible.

Air Traffic Control (ATC) constraints also introduce operational and cost penalties. ATC is primarily concerned with ensuring safe separation between aircraft and communicating their instructions to the aircraft. While ATC may be sensitive to expeditious routing, ATC does not explicitly take operational cost into account. Indeed, in current operations, ATC instructions are issued at a tactical level that do not allow sufficient time for planning by the aircraft operator in a way to reduce the impact of ATC on operating costs.

From a performance perspective, it is understood that by improving the planning of a flight, at both strategic and tactical levels, significant reductions of fuel burn and emissions can be achieved, the former of the order of several percentage points over current levels.

SUMMARY OF THE PRESENT INVENTION

Current operating practices, therefore, can be considered unsatisfactory and need to be complemented by a means that can enable better selection of flight operating points for specific flight conditions at both tactical and strategic levels.

Although a number of solutions have been proposed to facilitate more efficient trajectories to be flown in the presence of the need for tactical changes to be made to the flight plan to fly an aircraft in a truly efficient manner, more detailed consideration for air traffic constraints, aircraft performance and operational conditions need to be taken into account together. Such consideration can then enable the flight crew to fly an advantageous flight trajectory at the preferred speed and altitude profiles.

The subject matter of the present application recognizes the present limitations and needs and provides a system and method that can calculate an advantageous flight profile that takes into account developing operational conditions, air traffic constraints and aircraft performance in a timely manner on the flight management system that can allow tactical flight plan changes to be incorporated without unduly introducing operational or financial penalties to the operator.

The flight trajectory optimization techniques described herein optimize a trajectory the route of which, in terms of lateral movement over the ground, is already decided upon. Once the route is selected, the fuel burn depends on how the aircraft is flown. As such, vertical profile and speed schedules have a significant impact on the efficiency of a flight.

Current practice focuses on using the cost index to balance fuel cost with all other time dependent costs to find the best operating point for the operator (i.e. balance between time of flight and cost of fuel for faster flights). Aircraft today are flown on a selected cost index, which in turn defines the speed and vertical profile. Due to the limited processing power of flight management systems, algorithms generating the speed and vertical profiles are relatively simple and until now are not able to generate outputs that are sufficiently close to the theoretical optimal ones. Accordingly, known methods of operation do not provide the best gains.

The invention described herein presents a method and system that employs simple algorithms that can be used to identify an optimal flight path that can be executed on flight management systems with low processing power whilst being able to generate outputs (optimized speed and altitude profiles) that are sufficiently close to the theoretical optimal outputs.

An example method involves the parameterisation of optimal trajectories as functions (such as polynomials) of operational parameters (such as target altitude, required time of flight, track miles to be flown etc.), allowing computational systems, such as the aircraft's Flight Management System, to use such computed functions in the air to determine the optimal trajectory or flight profile required for the specific operating conditions quickly and accurately.

Optimal trajectories, forming the set on which the parameterisation process is performed, may be numerically determined 'a priori' on the ground as their generation may be computationally intensive. The parameterisation process may also be performed 'a priori', allowing the parameters to then be stored in the aircraft's computational system. The said computational system can then determine the optimal trajectory for the specific operating conditions using the said parameters.

BRIEF DESCRIPTION OF THE DRAWINGS

Exemplary embodiments of the invention will now be described with reference to the accompanying drawings, in which:

FIGS. 1(a) and 1(b) show a set of trajectories optimized for different operating weights;

FIG. 3 is a table showing an example 2-dimensional matrix, illustrating the variation of three 2nd order polynomial coefficients $a_{M,T}$, $b_{M,T}$ and $c_{M,T}$ with varying operating temperature and aircraft weight;

FIG. 4 presents an example of three multidimensional surfaces of the three coefficients $a_{M,T}$, $b_{M,T}$ and $c_{M,T}$ as functions of operating weight and ambient temperature;

DETAILED DESCRIPTION OF PREFERRED EMBODIMENTS

Figure 2A:
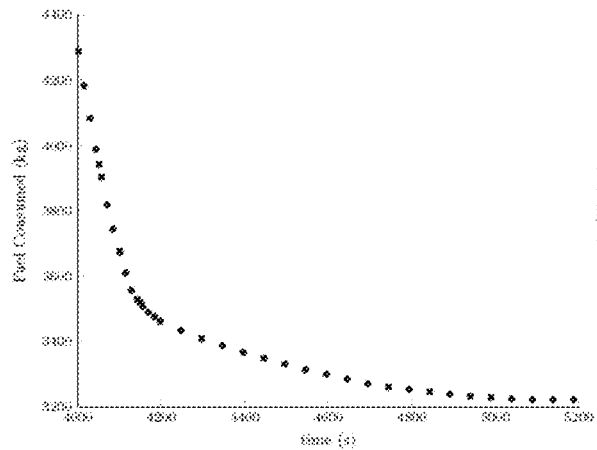
FIGS. 2(a)-2(c) show a set of trajectories optimized for a given operating environment, with each trajectory in FIG. 2(b) being represented by a point on the Pareto frontier of FIG. 2(a) and also characterized by the speed-altitude profile of FIG. 2(c)

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures unless otherwise indicated. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "memory," "memory unit," "storage medium," "computer readable storage medium," and the like, may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 2B:
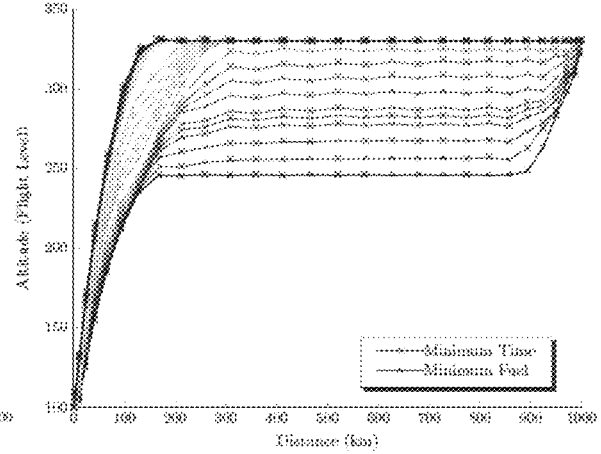
Figure 2C:
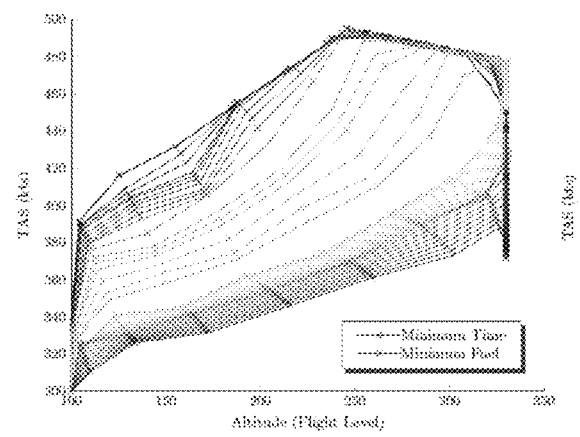

In a present example embodiment, a set of optimized trajectories for various operating conditions and optimized according to various criteria are generated using optimization techniques, such as pseudo-spectral algorithms. Examples of sets of optimized trajectories are presented in FIGS. 1 and 2. FIG. 1 presents a set of trajectories optimized for different operating weights. The diagrams of FIG. 2 present a set of trajectories optimized for a given operating environment, with various trajectories optimized for a balance between the two optimization objectives of minimum fuel burn and minimum flight time. Each trajectory in FIG. 2(b) is represented by a point on the Pareto frontier of FIG. 2(a) and also characterized by the speed-altitude profile of FIG. 2(c). It is known that different profiles can be generated for any particular trajectory.

Advantageously, the optimized trajectories are then parameterized to be described by simple polynomial functions using known curve-fitting techniques. In a present embodiment, quadratic functions are fitted onto the optimized trajectories, generating three polynomial coefficients for each quadratic function. It is understood that different parameterization techniques can be used, including, but not limited to, the use of different functions and different fitting techniques.

In a present embodiment, the optimized trajectories are advantageously divided into segments (or stages), according to specific strategies that optimized trajectories may adopt to achieve the target optimization objectives. In a present embodiment, the parameterization is done for each segment, thus generating one polynomial function for each segment of an optimized trajectory. Thus, sets of polynomial coefficients are generated, one set for each optimized trajectory defined by different operating conditions (variables such as aircraft weight, ambient temperature, etc.). This forms a multi-dimensional matrix of coefficients (which are hereinafter referred to as trajectory polynomial coefficients). FIG. 3 shows an example two-dimensional matrix, illustrating the variation of the three second order polynomial coefficients $a_{M,T}$, $b_{M,T}$ and $c_{M,T}$ with varying operating temperature and aircraft weight.

The size of the matrix may be relatively large, as each entry corresponds to one operating point. It is understood by those knowledgeable in the art that there are many possible operating points for a given environment (of weight, ambient conditions, etc.), and these translate to different CI values (the CI defines the balance between fuel burn and time of flight) that the flight can adopt in the particular environment. It is also known that there is an optimal trajectory for a given CI and this, mathematically translates to an operating point on a Pareto frontier as shown in FIG. 2(a). The edges of the Pareto frontier for the bi-objective (flight time and fuel burn) optimization represent optimal trajectories for minimum fuel burn and minimum flight time, with other points on the frontier representing the optimal operating point for particular balances between the two objectives. In an example embodiment of the present invention, the particular operating points (corresponding to particular balances between flight time and fuel burn and corresponding points on the Pareto frontier) are not stored as entries in the said matrices. Instead, trajectory polynomial coefficients for only those trajectories corresponding to minimum fuel burn and minimum flight time (that correspond to the extremities of the Pareto frontier) are stored. The coefficients of any other operating point on the Pareto frontier are then defined as a function of the balance between the two optimization objectives that form the variables of the Pareto frontier and the coefficients relating to the minimum flight time and minimum fuel burn trajectories. This further reduces the size of the three matrices containing the trajectory polynomial coefficients. It is understood that different optimization objectives other than the combination of minimum flight time and minimum fuel burn can be used.

The trajectory polynomial coefficients, as they vary with operating conditions, are then again fitted to functions which, in a present embodiment, are fourth order, multivariate polynomials, which produce three multi-dimensional surfaces, one for each trajectory polynomial coefficient, that describe how the relevant trajectory polynomial coefficient for a segment varies with varying operating conditions (such as different operating weights). FIG. 4 presents typical such surfaces—in the illustrated case the surface of the three coefficients $a_{M,T}$, $b_{M,T}$ and $c_{M,T}$ as functions of operating weight and ambient temperature only. These three surfaces are, in effect, described by three multi-dimensional matrices (one for each trajectory polynomial coefficient), each containing the coefficients of the fourth order polynomials defining the surface (hereinafter referred to as surface coefficients). Again, it is understood that different functions and different orders can be used for the said curve fitting of the trajectory polynomial coefficients.

The surface coefficients are then stored in the aircraft's flight management system or other airborne computer for use and generation of optimized trajectories in real time during flight. The generated optimized trajectories can then be used to program the aircraft systems such as the flight guidance system, flight management system or the autopilot.

Thus, the generation of the required optimized trajectory segment by the airborne computer involves the following steps:
1. identifying the appropriate values of the trajectory polynomial coefficients according to the present operating conditions (weight, temperature, etc.), and objectives (such as fuel burn and time of flight, or combination thereof). This is done by fitting the present operating conditions and objectives into the functions (equations) defined by the surface coefficients.
2. Generating the functions defining the optimised trajectory segments from the identified trajectory polynomial coefficients.
3. Generating the operating schedules (e.g. speed, altitude, etc.) from the optimised trajectory segments. The operating schedules can then be used to program the appropriate aircraft system.

This, in essence, is a reverse process of the one generating the surface functions but, as understood by those knowledgeable in the art, can be carried out very quickly and is thus achievable during flight.

Due to the characteristics of flight trajectories being distinctly different in certain different conditions, the division of optimized trajectories into sections or segments may vary accordingly. Indeed, different 'strategies' seem to be adopted by classes of optimized trajectories, according to operating constraints and each 'strategy' is, in a present embodiment, advantageously divided into different numbers of sections. Example sectionings of optimized trajectories according to 'strategy' are next described:

Example 1

Operating Intention—Climb to Altitude

In the Climb to Altitude example, the objective is that of flying from the initial to the final altitude for minimum flight time or minimum fuel burn (or a combination of both) in the most advantageous manner irrespective of the eventual distance to be flown. The optimization function (algorithm) requires, as parameters or inputs, the initial states $x_i$ (horizontal position), $h_i$ (altitude), $V_i$ (true airspeed) and $m_i$ (aircraft mass), final states $h_f$ and $V_f$ and T (temperature at MSL).

When climbing in an optimal manner for any combination of the two said objectives (that is, at any point on the Pareto frontier), the aircraft flies a sequence of three flight segments. In essence, the sequence involves a steady state climb profile with initial and final segments involving accelerations or decelerations to allow for adjustment of airspeed at the start and end of the steady state climb segment.

Figure 5:
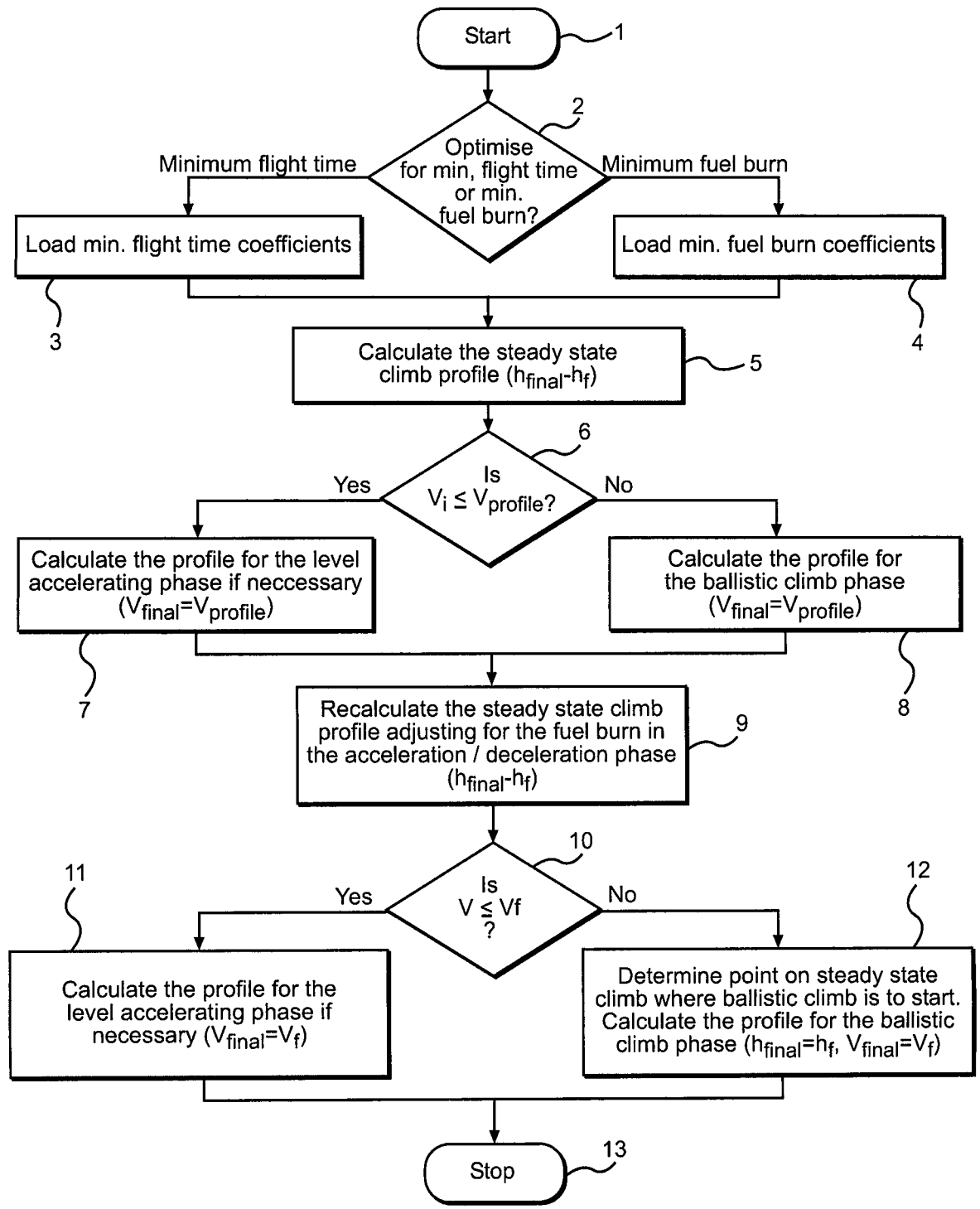
FIG. 5 illustrates a flowchart of an example algorithm generating the steady state climb trajectory segment for minimum fuel burn or minimum flight time.

A flowchart of the algorithm generating the climb to altitude trajectory for minimum fuel burn or minimum flight time is illustrated in FIG. 5. The steady state climb profile depends on the objective function (in this case the minimum flight time or minimum fuel burn), aircraft mass and ambient temperature. In this example embodiment, still air conditions are assumed. For considerations of wind, necessary known changes to the mathematical functions in the algorithm need to be made.

The algorithm starts at step 1 and then selects, in step 2, to execute either the step 3 that loads the trajectory polynomial coefficients of the minimum flight time optimized trajectory or the step 4 that loads those corresponding to the minimum fuel burn optimized trajectory. The algorithm then proceeds to calculate, at step 5, the optimized trajectory for the steady state climb segment. To generate the speed-altitude schedule of the optimal climb profile, and subsequently the calculation of the profile itself, the following equation is advantageously used:

$$V_{kts} = a_{M,T}\left(\frac{h_{ft}}{100}\right)^2 + b_{M,T}\left(\frac{h_{ft}}{100}\right) + c_{M,T} \qquad (1)$$

where $V_{kts}$ is the true airspeed in knots and $h_{ft}$ is the altitude in feet.

It is, of course, understood that different functions other than the preferred quadratic function, as well as different parameters other than true airspeed and altitude, can be used to describe the climb profile.

It is also understood that the optimal climb profile is calculated using computationally intensive optimisation algorithms (such as those using pseudo spectral techniques) that are accurate but are not suitable for implementation on the flight management system. Consequently, the generation of the optimal climb profile is, in a present embodiment, carried out 'a priori' on the ground.

The steady state climb profile segment is preceded by a first segment involving one of two flight strategies, either that of a level accelerating flight or a flight at the maximum rate of climb to decelerate to the target steady state climb speed. The relevant strategy is identified by comparing at step 6 the optimal climb speed at the initial altitude with the initial airspeed. If an acceleration is required, the Level Acceleration flight segment is calculated in step 7, otherwise the algorithm generates at step 8 a decelerating segment at maximum rate of climb.

After the calculation of the first segment, the steady state climb may be recalculated in step 9 to cater for adjustments (refinements) resulting from first segment.

When this is done, the third and final segment of the climb—that of matching the aircraft speed and altitude with the final target values—is calculated (steps 9-12). If the final velocity required is lower than that at the top of the steady state climb segment, a third segment involving the deceleration at maximum rate of climb is calculated in step 12. Otherwise, an accelerating phase at level flight is calculated at step 11. The algorithm then terminates at step 13, at which point, the complete trajectory, involving three segments, will have been generated and can be used to program the aircraft systems such as the flight guidance, flight management or autopilot computers.

Example 2

Operating Intention—Climb to a 3D Point in Space

In the Climb to a 3D point in space, the objective is that of flying from an initial (first) to a final (second) point in space.

It is known that most minimum flight time trajectories adopt a non-steady climb with a segment of flight at the crossover altitude, while in other circumstances steady climbs may be adopted. In the case of minimum fuel burn trajectories, the climb is always continuous to the final altitude. Consequently, minimum flight time and minimum fuel burn trajectories are treated independently in two separate algorithms.

A—Optimisation for Minimum Flight Time

Figure 6:
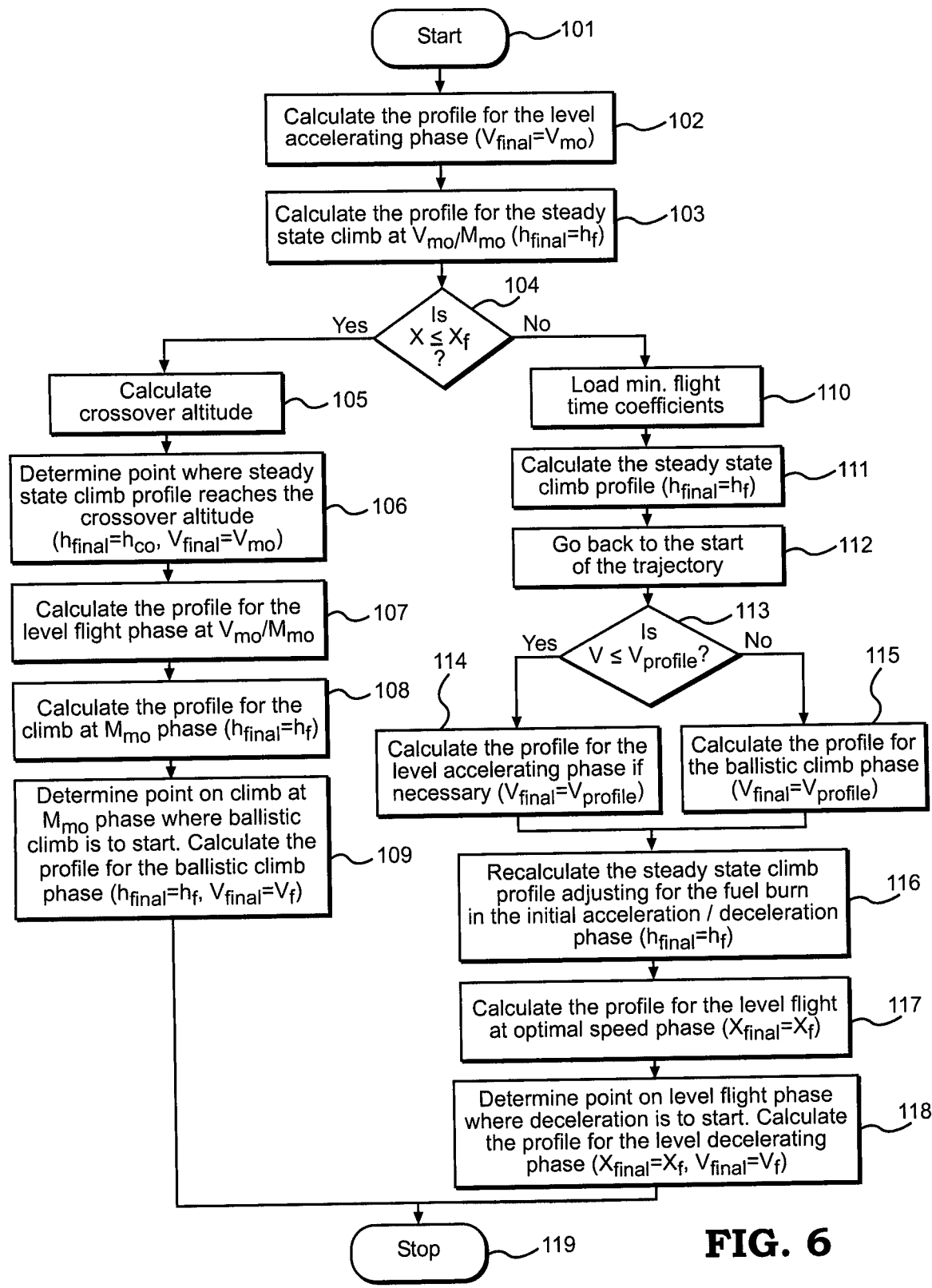
FIG. 6 illustrates a flowchart of an example algorithm for minimum flight time.

The flowchart of the algorithm for minimum flight time is presented in FIG. 6. On start-up (step 101), the algorithm calculates a first profile for the aircraft to accelerate to maximum speed (step 102) and then, in step 103, calculates a profile for steady-state climb at maximum speed to the final target altitude. If the distance covered is less than the distance that will need to be covered to arrive at the final target point in space, then a level flight segment at maximum speed at the crossover altitude needs to be inserted in the desired trajectory. This is done through steps 105 to 109: first the crossover altitude is determined (step 105); then the point at which the steady state climb profile calculated in step 103 is determined (step 106). Then the length and speed of the level flight phase at the crossover altitude is determined (step 107) and the profile for the remainder of the steady-state climb at the end of the level flight phase is calculated (step 108). A final segment, involving a deceleration to the final airspeed during climb is calculated in step 109. In this way, such a profile is split into five segments, namely:
 a) a level flight segment involving the acceleration to the maximum speed $V_{MO}$,
 b) a steady-state climb at $V_{MO}$ to the crossover altitude,
 c) a level flight segment at $V_{MO}/M_{MO}$ (maximum operating speed $V_{MO}$ is equal to the maximum operating Mach $M_{MO}$ at the crossover altitude)
 d) a stead-state climb segment at $M_{MO}$, and
 e) a Maximum Rate of Climb segment to the final altitude, allowing the aircraft to decelerate to the target end Mach (airspeed).

In a present embodiment, the steady-state climb profile (segments (b) and (d)) are calculated in a similar manner as that calculated in the Climb to Altitude algorithm (Example 1). Consequently, the relevant coefficients $a_{M,T}$, $b_{M,T}$ and $c_{M,T}$ for the given operating condition (aircraft mass, temperature, etc.) are used.

When the track distance allowed for in the climb is insufficient to achieve the desired final altitude, the algorithm of a present embodiment attempts to define a trajectory for climb to altitude at a slower (but still optimized) speed that will allow for an adequate rate of climb to achieve the target end-point (steps 110 to 118). The algorithm first calculates the steady-state climb profile at the optimal speed for the conditions (steps 110 and 111). Then, depending on the value of the initial airspeed in relation to the steady-state climb speed at the initial altitude (step 113), one of two flight strategies is adopted at the start of the trajectory—either a level flight acceleration segment is introduced (step 114) or a decelerating, maximum rate of climb segment is calculated (step 115). This alteration will require the re-calculation of the steady-state climb profile, which is carried out in step 116. The steady-state climb is followed by a level flight segment at final altitude and a preferred optimal airspeed according to operating conditions and a final segment that adjusts the airspeed to the final speed. These two segments are calculated in steps 117 and 118 respectively.

B—Optimisation for Minimum Fuel Burn

Figure 7:
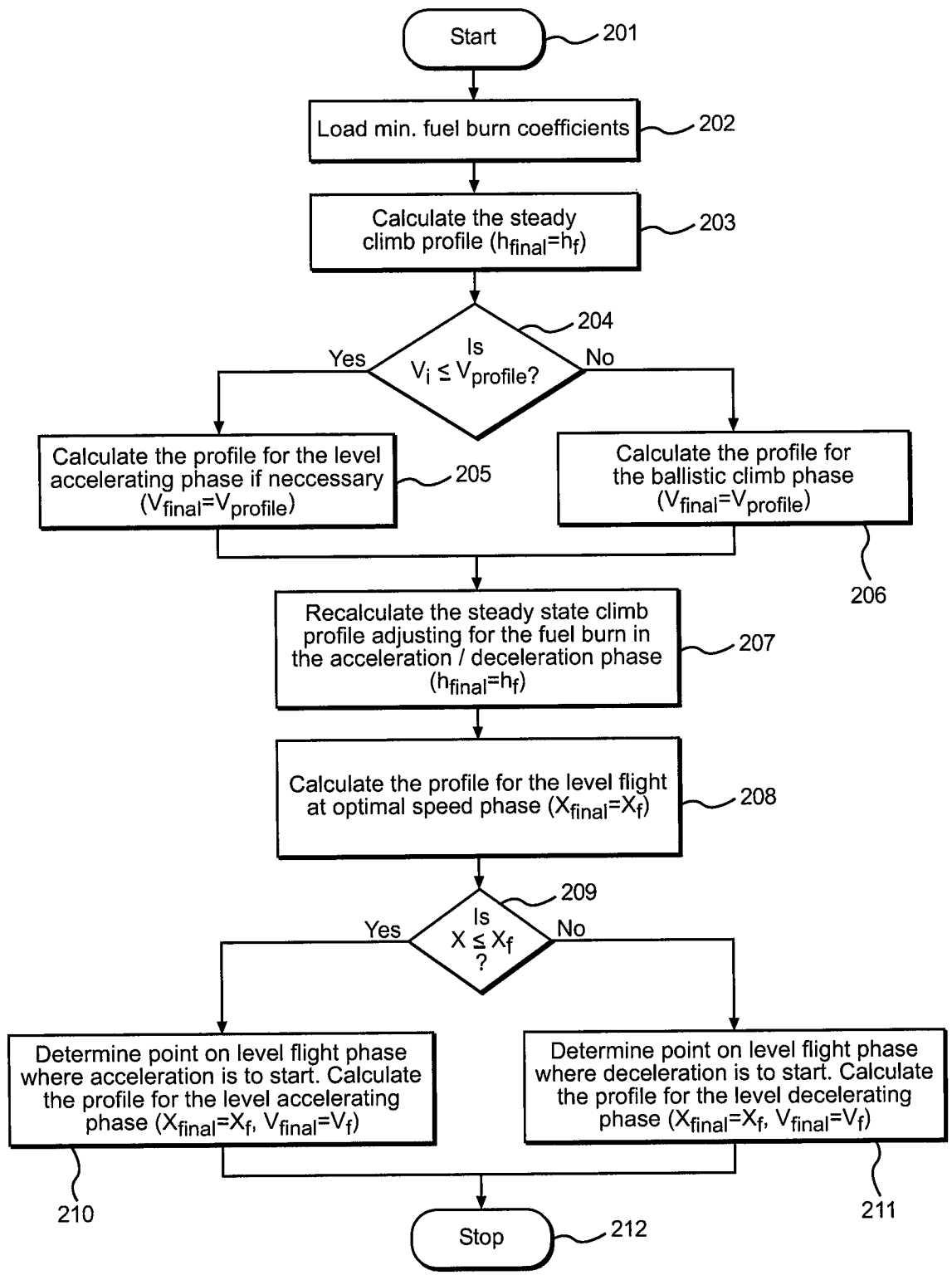
FIG. 7 illustrates a flowchart of an example algorithm for the optimisation for minimum fuel burn.

The climb strategy adopted in a minimum fuel burn climb to a 3D point in space contains a constant, steady-state climb that is usually followed by a cruise segment at final altitude at optimal speed. These two segments together are preceded and followed by segments. The preceding segment involves a speed adjustment from initial aircraft speed and the following segment involves a speed adjustment to final aircraft speed. Consequently, the algorithm, which is illustrated in the flowchart of FIG. 7, starts with the calculation of the steady state climb profile (steps 202 and 203) using the relevant coefficients $a_{M,T}$, $b_{M,T}$ and $c_{M,T}$ calculated according to the prevailing environmental and operating conditions, to produce a speed-altitude schedule. As in Example 1, the speed transition segment (from initial aircraft speed to initial climb speed), which involves either an accelerating segment in level flight or a decelerating, climbing segment, is calculated in steps 204, 205 and 206. The trajectory of the steady state climb to altitude segment is then refined (recalculated) in step 207. Next, the cruise at optimal speed and final altitude is calculated in step 208 and the final accelerating/decelerating segment at level flight is determined (step 210 for an accelerating segment and step 211 for a decelerating segment).

Embodiment 3

Climb to a 3D Point in Space in a Fixed (Pre-Specified) Time

The Climb to a 3D point in space in a fixed time extends Example 2, (Climb to a 3D point in space) to also include a fixed flight time, which often relates to a target time of arrival (known as TTA, which herein is the same as the required time of arrival, or RTA). In this context, it is of value to fly the most economical trajectory in the corresponding flight time once a TTA is assigned.

Mathematically, optimising the trajectory against two objectives, such as minimum flight time and minimum fuel burn, gives rise to a Pareto frontier of optimal solutions, as that shown in FIG. 2. Each one of these solutions corresponds to the speed-altitude schedule that consumes the least fuel burn for a given flight time. The algorithm described herein generates trajectories corresponding to individual points on the said Pareto frontier.

Figure 8A:
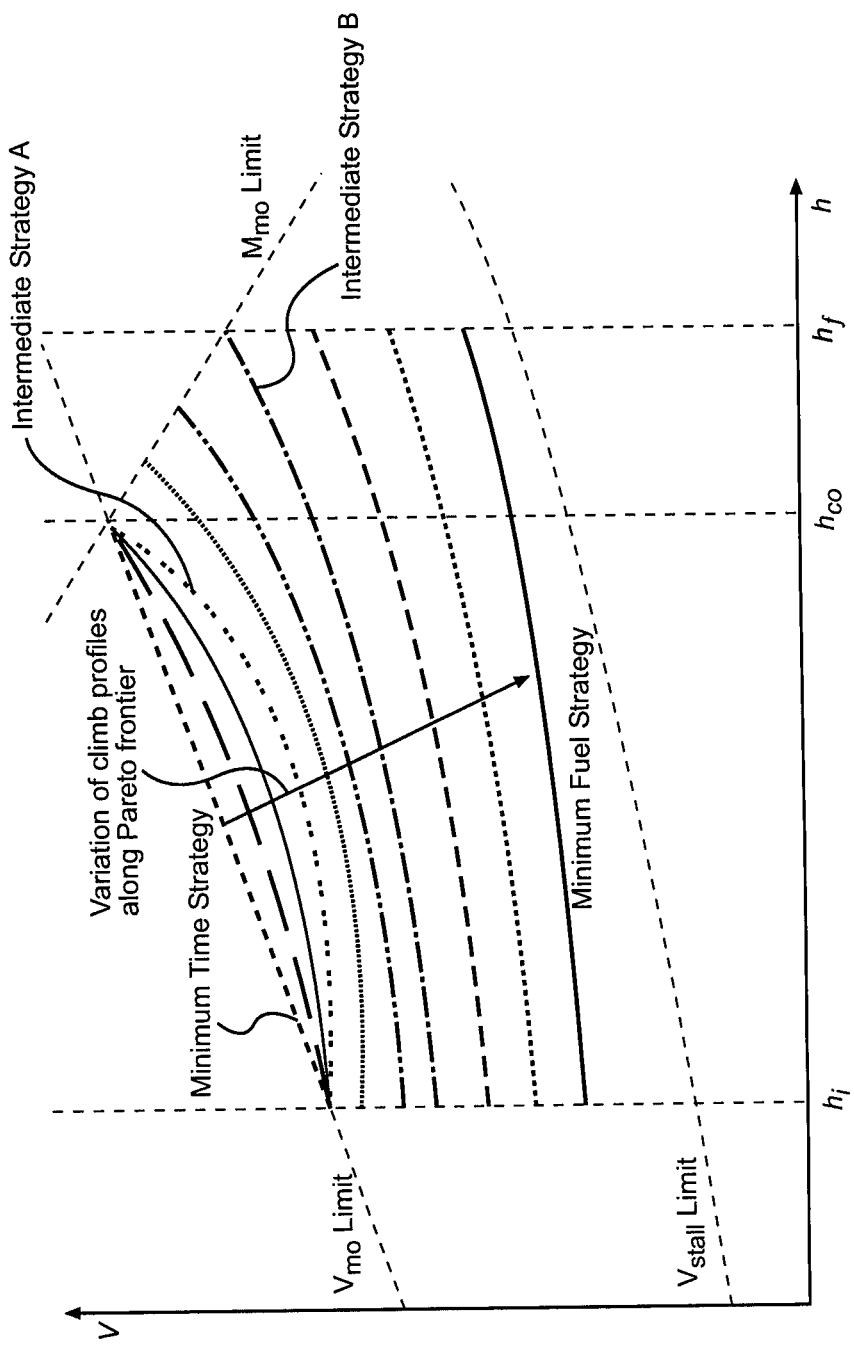
FIG. 8(a) illustrates a conceptual graph of speed-altitude schedules of a set of Pareto solutions.

The diagram in FIG. 8(a) presents speed-altitude schedules of a generic set of Pareto solutions—in this case for a low operating weight condition—bounded by the speed envelope (defined by the stall speed, and maximum operating speed and Mach). The extremities of the set represent the two trajectories optimized for minimum flight time and minimum fuel burn respectively.

FIG. 8(a) illustrates how moving along the Pareto frontier translates to climb profiles progressively changing in shape from that for a minimum flight time towards that for minimum fuel burn.

Trajectories corresponding to the operating points closest to that for minimum flight time adopt a two-step climb profile interrupted with a level flight phase at the cross-over altitude.

At a certain point along the Pareto frontier, corresponding to the trajectory with 'Intermediate Strategy A' in FIG. 8(a), the level flight segment starts getting progressively higher (and shorter in duration and length) until, at the operating point corresponding to the trajectory with Intermediate Strategy B, there will be no level flight segment at all. Consequently, the climb for the remaining solutions on the Pareto Frontier will be a continuous, steady climb with progressively lower airspeeds the closer the solutions get to the climb profile for the minimum fuel burn trajectory.

Figure 8B:
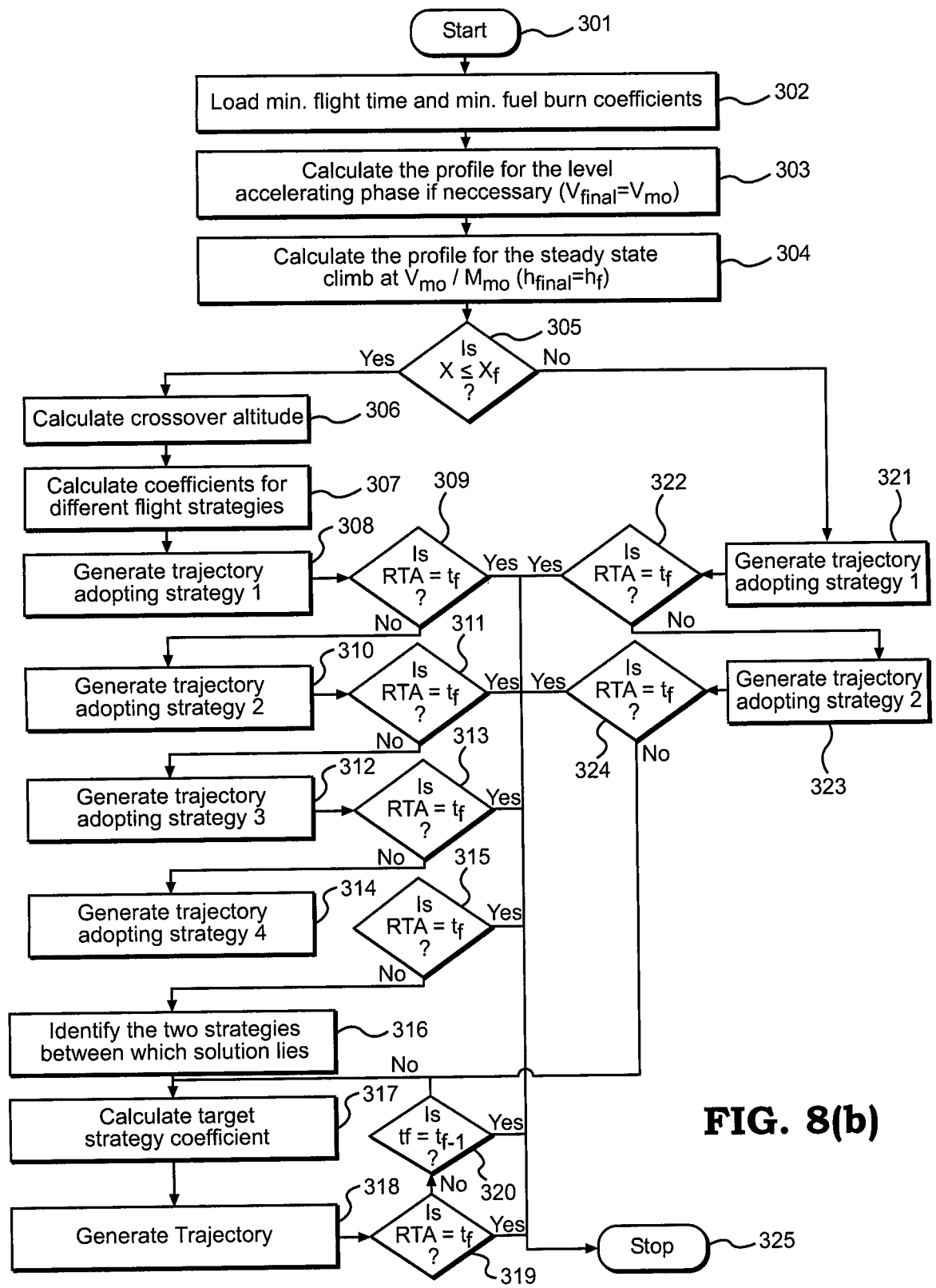
FIG. 8(b) illustrates a flowchart of an example algorithm generating the optimised trajectories for a climb to a 3D point in space within a defined flight time.

The flow chart of the algorithm generating the optimised trajectories for a climb to a 3D point in space within a defined flight time is presented in FIG. 8(b). The algorithm is divided into three parts, namely:

1. the determination of the climb strategy adopted by the minimum flight time solution (i.e., whether continuous without a level flight segment at the crossover altitude or otherwise).
2. the generation of the minimum flight time and minimum fuel burn solutions and if necessary, those of Intermediate Strategies A and B.
3. the generation of the required optimal solution with a pre-defined flight time.

Accordingly, in the first three steps (steps 302, 303 and 304 in FIG. 8(b)) the algorithm calculates the initial acceleration stage required to accelerate the aircraft to VMO, and the climb stage to the final altitude at VMO or MMO, as relevant. This constitutes the generation of a trajectory with minimum flight time to altitude. The distance covered by this trajectory is then compared with the distance to be covered by the required flight (step 305), and if the former is smaller, a segment of level flight at VMO/MMO at the crossover altitude is inserted (steps 306 to 308), otherwise the minimum flight time trajectory will be a continuous climb and the algorithm continues with steps 321 onwards.

When the minimum flight time strategy involves a steady climb only (i.e., no level flight at the crossover altitude) the algorithm proceeds with steps 321 onwards. Under such conditions, only two reference trajectories are required, as the two—one for minimum flight time and the other for minimum fuel burn, both involve continuous climbs. Consequently, in steps 321 and 323, the algorithm calculates the minimum flight time (strategy 1) and minimum fuel burn (strategy 2) steady climb trajectories using the 'Climb to a 3D point in space' algorithm as described in Example 2.

Since the flight strategies adopted by optimized trajectories along the Pareto frontier when the minimum flight time has a level flight segment at the crossover altitude will vary significantly along the frontier, four different reference trajectories, referred to as 'reference strategies' in FIG. 8(b), need to be generated. These are the reference trajectories for minimum fuel burn (referred to as 'Minimum Time Strategy' in FIG. 8(a) and 'Strategy 1 in FIG. 8(b)), those relating to 'Intermediate Strategy A' and 'Intermediate Strategy B' in FIG. 8(a) (Strategies 3 and 4 respectively in FIG. 8(b)), and that relating to 'Minimum Fuel Strategy' (Strategy 2 in FIG. 8(b)). These are calculated in steps 308, 312, 314 and 310, respectively. Step 308 calculating the minimum fuel burn trajectory and Step 310 calculating that for minimum flight time generate the trajectories according to the 'Climb to a 3D point in space' algorithm described in Example 2. Step 312, relating to Intermediate Strategy A (strategy 3), involves a strategy similar to the minimum fuel burn solution in step 310, with one difference. The climb profile polynomial used to calculate the target airspeed uses the coefficients according to equation 20. The last of the four reference trajectories, i.e. Intermediate Strategy B (strategy 4), is generated in step 314. The strategy is similar to Intermediate Strategy A, with two differences. The climb profile coefficients are derived according to equation 18, and upon reaching the final altitude hf, the airspeed does not decrease linearly with fuel burn but remains constant at the maximum operating airspeed. Once the four reference trajectories are generated, the algorithm determines, in step 316 between which two reference strategies the optimized trajectory to be calculated will lie. These two reference trajectories are hereinafter referred to as 'boundary reference trajectories', as they bound the area within which the required optimized trajectory will lie. It is immediately understood by those knowledgeable in the art that the reference trajectories generated by steps 321 and 323 are also boundary reference trajectories.

The final part of the algorithm involves the generation of the required optimized trajectory. The first step in achieving this involves the calculation of two sets of boundary reference trajectories, one with a flight time lower than, and the other with a flight time higher than the RTA (which relates to the flight time of the desired optimized trajectory). The trajectory polynomial coefficients for the reference trajectories are then calculated and these are used to determine, through interpolation, the set of trajectory polynomial coefficients corresponding to the optimized trajectory with a flight time corresponding to the RTA. This is carried out in step 317. This set of trajectory polynomial coefficients is then used by the algorithm in step 318 to generate the required optimized trajectory.

The four curves representing the minimum fuel burn strategy, Intermediate Strategy B, Intermediate Strategy A and minimum flight time strategy are defined by the following four polynomials respectively:

$$V = a_{MF}h^2 + b_{MF}h + c_{MF} \quad (2)$$

$$V = a_{IB}h^2 + b_{IB}h + c_{IB} \quad (3)$$

$$V = a_{IA}h^2 + b_{IA}h + c_{IA} \quad (4)$$

$$V = a_{MT}h^2 + b_{MT}h + c_{MT} \quad (5)$$

The values of the coefficients a, b and c for each of equations 2, 3, 4 and 5 are determined as follows:

The coefficients for the minimum fuel burn strategy (equation 2), i.e., $a_{MF}$, $b_{MF}$ and $c_{MF}$ are calculated as described in the Climb to a 3D point in space algorithm (Embodiment 2).

Figure 8C:
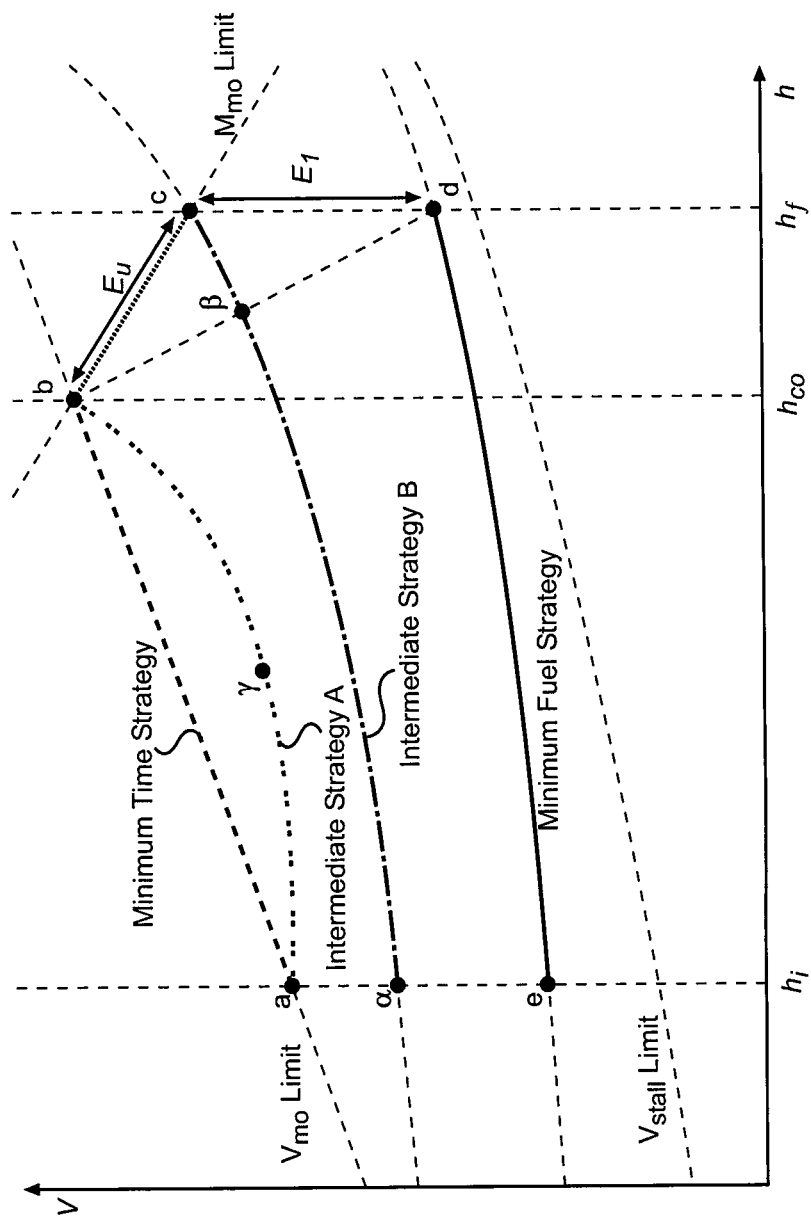
FIG. 8(c) illustrates a conceptual graph of speed-altitude schedules of a set of Pareto solutions.

To find the coefficients of the other strategies it is necessary to determine points a, b, c, d and e on the speed-altitude schedule, as shown in FIG. 8(c). Points a, b and c have explicit coordinates whilst those of d and e are expressed in terms of points on the minimum fuel burn curve. Consequently they are defined in terms of $a_{MF}$, $b_{MF}$ and $c_{MF}$. The coordinates of these points are defined as follows:

$$a : (h_i, V_{mo,hi}) \quad (6)$$

$$b : (h_{co}, V_{mo,hco}) \quad (7)$$

$$c : (h_f, V_{Mmo,hf}) \quad (8)$$

$$d : (h_f, a_{MF}h_d^2 + b_{MF}h_d + c_{MF}) \quad (9)$$

$$e : (h_i, a_{MF}h_d^2 + b_{MF}h_d + c_{MF}) \quad (10)$$

The coefficients for the minimum flight time strategy (equation 5), i.e., $a_{MT}$, $b_{MT}$ and $c_{MT}$ are obtained graphically from FIG. 8(c):

$$a_{MT} = 0 \quad (11)$$

$$b_{MT} = (V_a - V_b)/(h_a - h_b) \quad (12)$$

$$c_{MT} = V_a - b_{MT}h_a \quad (13)$$

The coefficients for Intermediate Strategy B (equation 3) are calculated as follows: Points a and β on Intermediate Strategy B in FIG. 8(c) are found using the ratio of the euclidean distances $E_u$ and $E_1$ between points b and c, and c and d respectively. Point a lies on the straight line joining a and b, whereas point β lies on the straight line joining points b and d. The distances $E_u$ and $E_l$ are calculated using equations 14 and 15:

$$E_u=((V_b-V_c)^2+(h_b-h_c)^2)^{1/2} \quad (14)$$

$$E_l=V_c-V_d \quad (15)$$

The resulting Euclidean ratio $E_r$ is equal to:

$$E_r=E_u/(E_l+E_u) \quad (16)$$

The coordinates of a and β are found from $E_r$ such that:

$$a:(h_b,V_a-E_r(V_a-V_e)) \quad (17)$$

$$\beta:(h_b+E_r(h_d-h_b),V_b-E_r(V_b-V_d)) \quad (18)$$

The coefficients $a_{IB}$, $b_{IB}$ and $c_{IB}$ of the $2^{nd}$ order curve fitted to Intermediate Strategy B are found by fitting coordinates a, β and c, corresponding three points on the curve according to the standard matrix equation:

$$\begin{bmatrix} V_a \\ V_\beta \\ V_c \end{bmatrix} = \begin{bmatrix} h_a^2 & h_a & 1 \\ h_\beta^2 & h_\beta & 1 \\ h_c^2 & h_c & 1 \end{bmatrix} \begin{bmatrix} a_{IB} \\ b_{IB} \\ c_{IB} \end{bmatrix} \quad (19)$$

The coefficients for Intermediate Strategy A (equation 4) are calculated as follows: point γ at an altitude on the curve half way between $h_a$ and $h_b$ will be equidistant between the values for minimum flight time and Intermediate Strategy B for the same altitude.

Consequently, the coordinates of γ mathematically correspond to:

$$\gamma: {}^{1/2}(h_a+h_b), {}^{1/2}[(a_{MT}h_\gamma^2+b_{MT}h_\gamma+c_{MT})+a_{IB}h_\gamma^2+b_{IB}h_\gamma+c_{IB})] \quad (20)$$

The coefficients $a_{IA}$, $b_{IA}$ and $c_{IA}$ of the 2nd order curve fitted to Intermediate Strategy A are found by fitting coordinates a, β and cγ, corresponding three points on the curve according to the standard matrix equation:

$$\begin{bmatrix} V_a \\ V_b \\ V_\gamma \end{bmatrix} = \begin{bmatrix} h_a^2 & h_a & 1 \\ h_b^2 & h_b & 1 \\ h_\gamma^2 & h_\gamma & 1 \end{bmatrix} \begin{bmatrix} a_{IA} \\ b_{IA} \\ c_{IA} \end{bmatrix} \quad (21)$$

Figure 10:
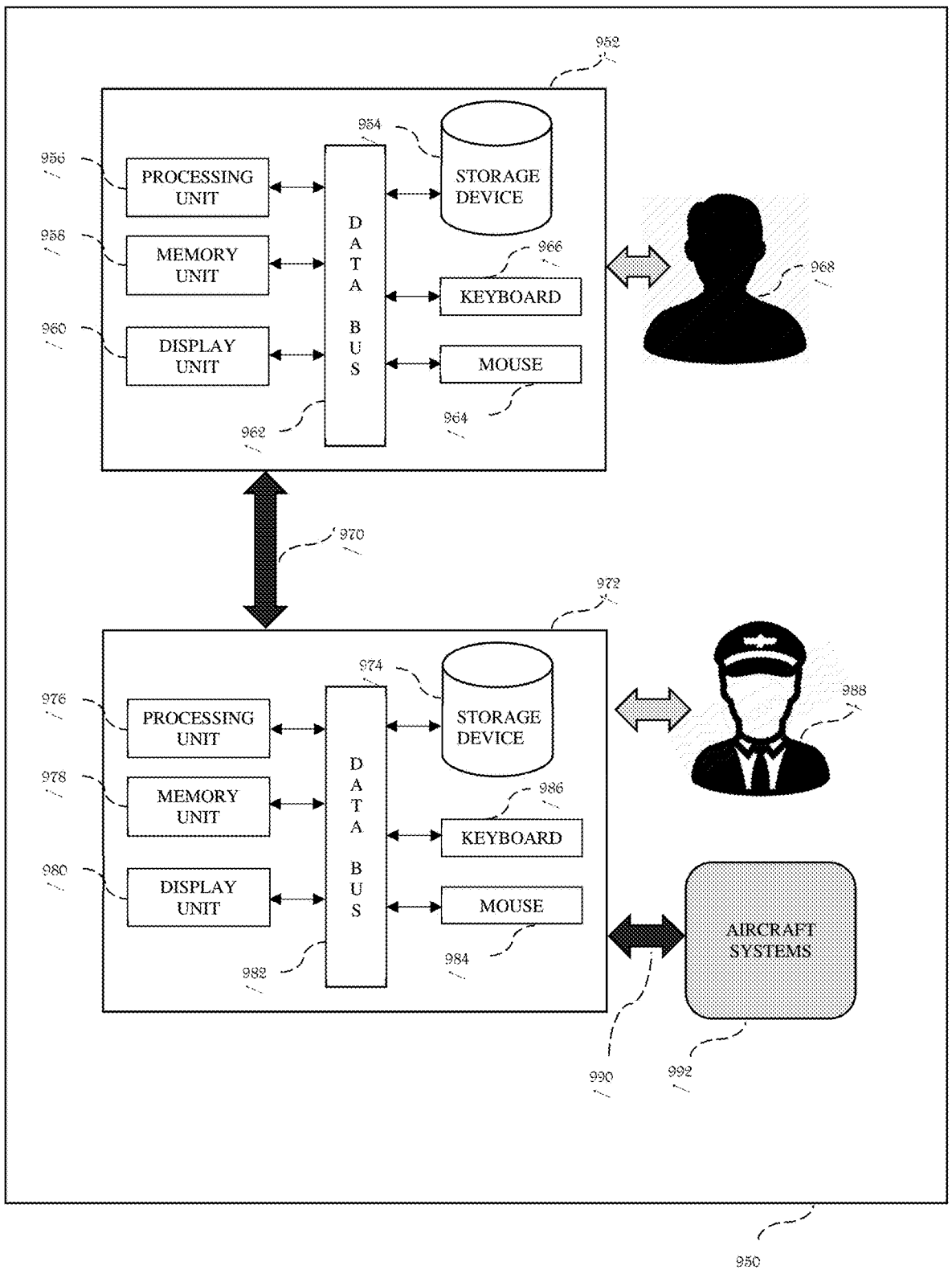
FIG. 10 an example embodiment of a system for obtaining and implementing the optimization of a preferred trajectory for an aircraft.

An example embodiment of a system configured to execute the above processes is shown in FIG. 10. As shown in FIG. 10, the system 950 comprises a first computing device 952 such as a computer that, in an example embodiment, may be located on the ground and operated by a technician 968. The first computing device 952 includes a storage device/memory 954 that stores optimization software configured with computational programming/instructions implementing the methods and algorithms of the present invention. The storage device 954 is operatively connected to a keyboard 966 and/or a mouse 964 via a data bus 962.

Figure 9A:
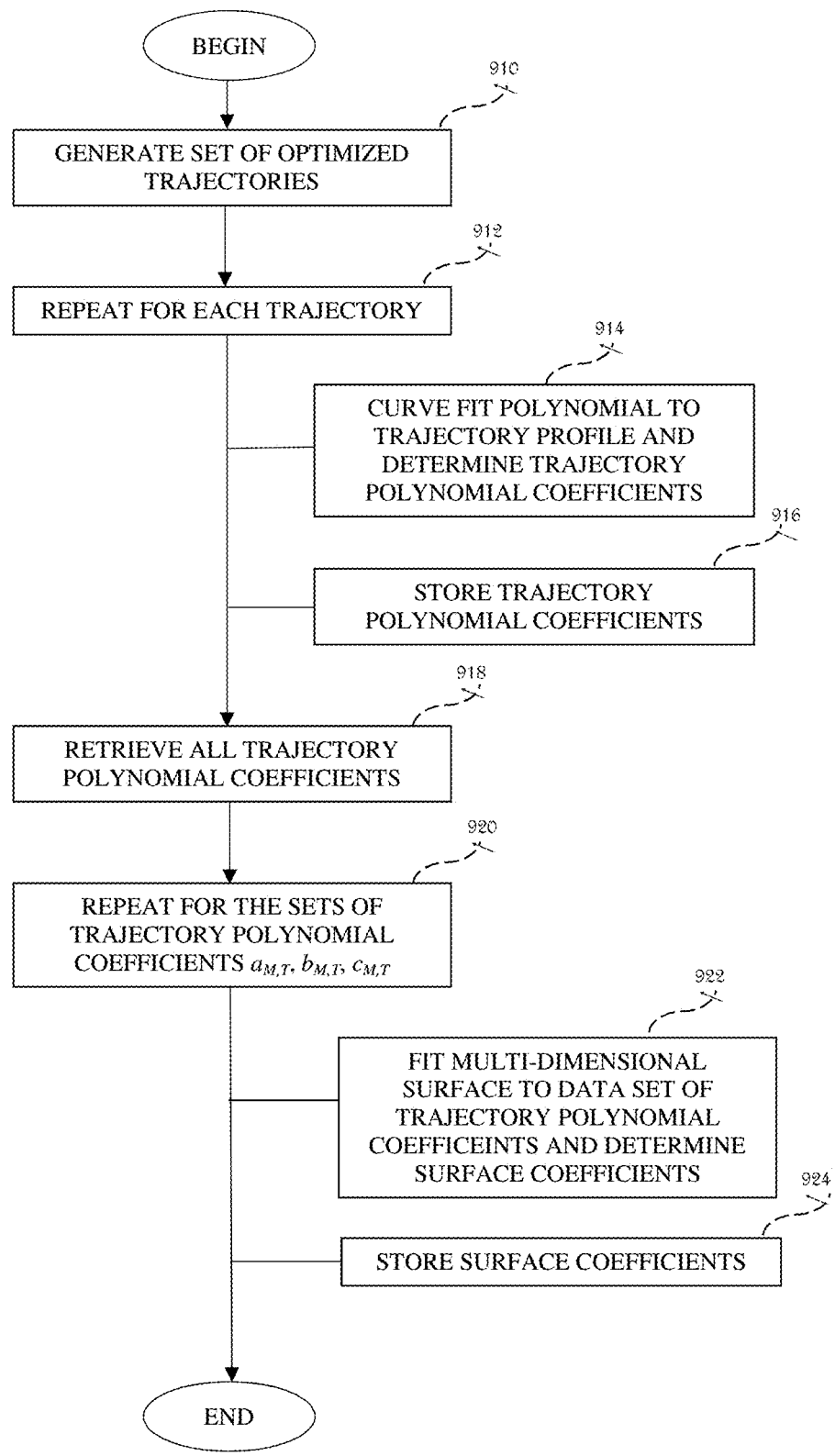
FIG. 9(a) illustrates a flowchart of an example method of generating a set of surface coefficients to be used in generating a preferred aircraft trajectory.

The first computing device 952 performs the steps of FIG. 9(a), via a processing unit 956, such as a microprocessor, which executes the instructions stored in the storage device 954, and results in the generation of the set of surface coefficients. In the first step 910, the computing device 952 generates, via the processing unit 956, a set of optimized trajectories for various operating conditions and optimization objectives. These optimized trajectories are stored in the storage device 954. Then, for each generated optimal trajectory, a polynomial is curve fitted to the trajectory and the trajectory polynomial coefficients relating to the optimized trajectory are determined (step 914) in accordance with the instructions executed by the processing unit. The trajectory polynomial coefficients, which are temporarily stored in the memory unit 958, are then stored (step 916) in the storage device 954.

Once all the trajectory polynomial coefficients are determined and stored in the storage device 954, the first computing device 952 then, in step 918, proceeds to retrieve the complete set of trajectory polynomial coefficients from the storage device 954. These coefficients are stored in the memory unit 958, from where the processing unit 956 accesses the data to fit the multi-dimensional surfaces to the coefficients $a_{M,T}$, $b_{M,T}$ and $c_{M,T}$ and determine the surface coefficients pertaining to these surfaces (step 922, repeated for the three trajectory surface coefficients $a_{M,T}$, $b_{M,T}$ and $c_{M,T}$). The first computing device 952 then, in step 924 stores the surface coefficients in the storage device 954.

It is understood that the process of FIG. 9(a) can be performed in groups of steps and even on different computers. For example, it is possible to generate and store the optimized trajectories in one process to then retrieve the said trajectories at another time to carry out steps 912, 914 and 916. It is then possible to perform steps 918, 920, 922 and 924 at yet another time, thus splitting up the process into, for example, three sessions.

The first computing device 952 has a keyboard 966, mouse 964 and display unit 960 through which the technician 968 can interact with the first computing device 952 and the processes it executes. For example, the technician 968 configures the optimization software via the keyboard 966 and mouse 964 to generate the set of optimized trajectories for different environmental and operating conditions.

The surface coefficients stored in the storage device 954 in the first computing device 952 are transferred to a second computing device 972. This transfer can be performed through, for example, a wireless link 970 or through digital media such an external storage device such as a USB stick or compact disk and stored in the storage device 974 within the second computing device 972. The second computing device 972 is typically a device that is either installed or carried on the aircraft.

The second computing device 972, such as a computer, includes a storage device 974 operatively connected to a mouse 984 and a keyboard 986 via a data bus 982. The second computing device 972 also includes at least one processing unit or processor 976, memory 978 and display 980 operatively connected to the data bus 982.

Figure 9B:
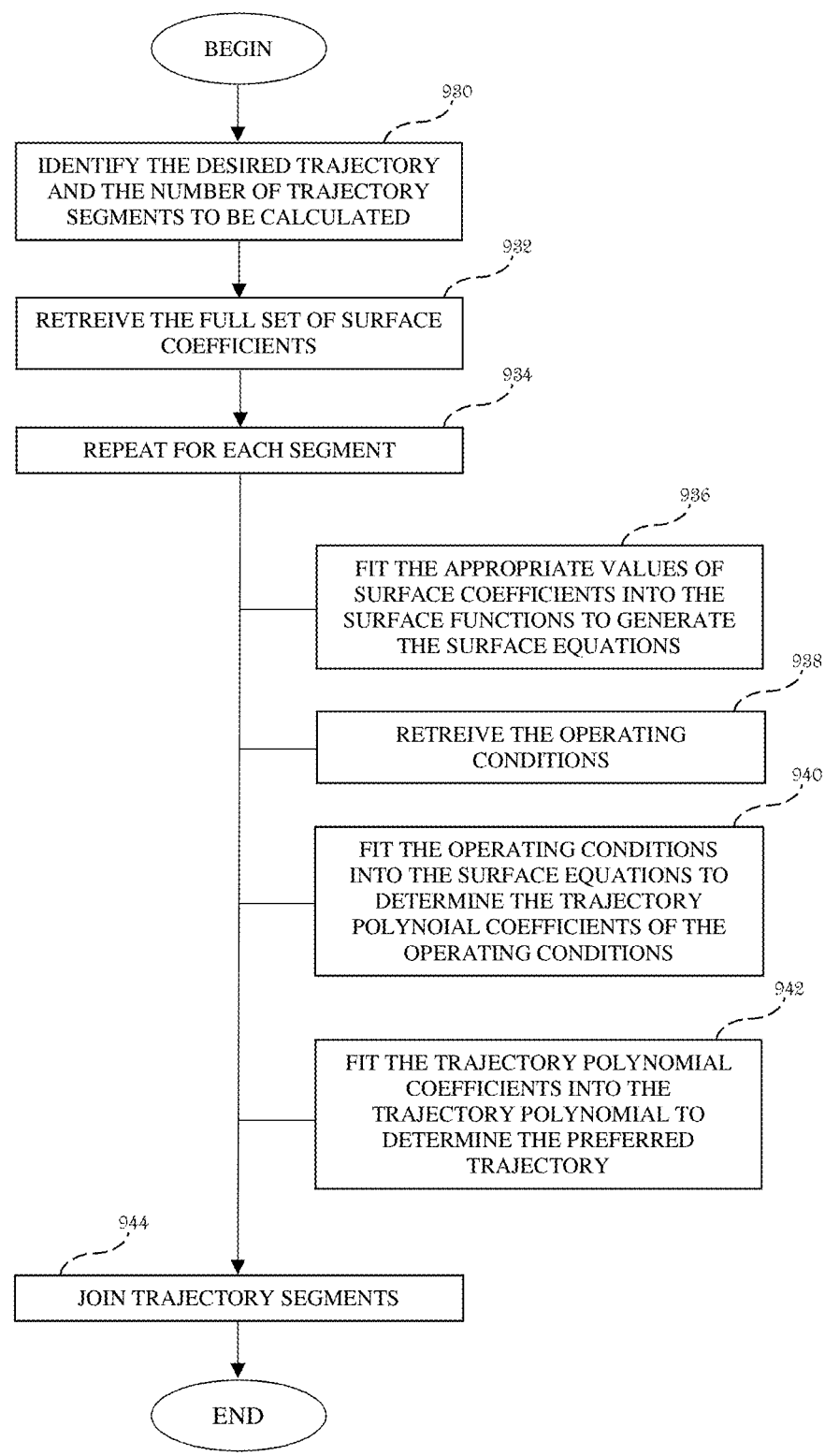
FIG. 9(b) illustrates a flowchart of an example method of generating a preferred trajectory the aircraft according to which an aircraft can then be commanded to fly.

The second computing device 972 performs the steps of FIG. 9(b), via the processor 976 which results in the generation of the preferred trajectory the aircraft according to which the aircraft can then be commanded to fly. Typically, the desired trajectory (for example, a climb to altitude from a particular airfield) is identified (step 930) through input by the pilot 988 via the keyboard 986 and/or mouse 984. This may alternatively be done automatically via a datalink 990 with the aircraft systems 992 (such as the flight management computer). Once the trajectory to be flown is identified, the precise number of segments the trajectory is divided into is determined. Next, the processing unit 976 executes step 932 in accordance with instructions stored in the storage device 974 to retrieve the full set of surface coefficients stored in the storage device 974. The processing unit then uses, for each segment, the appropriate values of the surface coefficients to generate the equations of the surface functions (step 936);

and obtains the operating conditions (such as aircraft weight, ambient temperature, altitude, etc.) in step 938. Step 938 may involve entry of values by the pilot 988 via the keyboard 986 and/or mouse 984 or data acquisition from the aircraft systems 922 via datalink 990.

The second computing device 972 then fits the data to the surface equations to determine the trajectory polynomial coefficients of the preferred trajectory in the relevant segment (step 940), from which the preferred trajectory is then calculated (step 942) by the processing unit 976. Finally, the trajectories generated for each segment are joined in step 944 to form the overall preferred trajectory. The resulting preferred trajectory may also be displayed on the display unit 980. This trajectory is then transferred to the aircraft guidance and control systems 992 via datalink 990 and the segments are flown in accordance with the preferred trajectories.

The invention claimed is:

1. A method of generating optimal flight trajectories for an aircraft, comprising the steps of:
    generating a set of optimal flight trajectories for an aircraft for respectively different operating conditions;
    identifying and storing coefficients describing the set of optimal flight trajectories including the steps of:
        i) selecting a first optimal flight trajectory from the set of optimal flight trajectories,
        ii) identifying, using a mathematical curve fitting technique on the selected first optimal flight trajectory, and storing a set of first coefficients that describes the selected first optimal flight trajectory, and
        iii) repeating steps (i) and (ii) for different optimal flight trajectories from the set of optimal flight trajectories, to create and store multiple sets of first coefficients;
    calculating multiple sets of second coefficients describing a variation of the first coefficients with operating conditions of the aircraft, including the steps of:
        i. selecting the first coefficient of each stored set of first coefficients,
        ii. identifying, using a mathematical curve or surface fitting technique on the selected first coefficients, and storing a set of second coefficients that describes the variation of first coefficients with operating conditions of the aircraft, and
        iii. repeating steps (i) and (ii) for the second coefficient of each stored set of first coefficients to create and store a second set of second coefficients,
        iv. repeating steps i. and ii. for the remaining coefficients of each stored set of first coefficients, to create and store multiple sets of second coefficients; and
    generating a preferred flight trajectory for the aircraft based on the multiple sets of second coefficients.

2. The method of claim 1, wherein the steps of:
    generating the set of optimal flight trajectories;
    calculating the set of first functions;
    identifying and storing the first set of coefficients;
    calculating the set of second functions; and
    calculating and storing the second set of coefficients;
are performed on the ground before a flight of the aircraft.

3. The method of claim 1, whereby the step of generating the preferred flight trajectory based on the second set of coefficients is performed prior to or during a flight of the aircraft.

4. The method of claim 1, wherein the set of first functions are polynomial functions.

5. The method of claim 1, wherein the second functions are polynomial functions.

6. The method of claim 1, wherein the set of optimal flight trajectories is determined using pseudo-spectral optimization techniques.

7. The method of claim 1, wherein an optimized flight trajectory is defined by a plurality of functions.

8. The method of claim 7, wherein an optimal flight trajectory is split into different segments, and each segment is defined by a unique function.

9. The method of claim 1, wherein an optimal flight trajectory is calculated according to one or more optimization objectives.

10. The method of claim 1, wherein when at least one optimal flight trajectory is calculated according to more than one optimization objective, the functions describing the at least one optimal flight trajectory according to a balance of a plurality of optimization objectives is calculated by:
    defining a third set of functions that describe the variation of the set of first coefficients with a ratio or balance of optimization objectives and calculating a set of third coefficients describing the third set of functions;
    determining preferred flight trajectories based on the set of second coefficients, one for each individual optimization objective; and
    determining preferred flight trajectories based on the set of third coefficients and the preferred flight trajectories according to single optimization objectives, for a desired balance of optimization objectives.

11. The method of claim 1, wherein the generating of the preferred flight trajectory for the aircraft based on the set of second coefficients includes generating the preferred flight trajectory at an on-board computer operatively connected to aircraft control systems, and the entering of the preferred flight trajectory into aircraft control systems includes entering the preferred flight trajectory via a data link.

12. A system for generating optimal flight trajectories for an aircraft, the system comprising:
    memory storing computer-readable instructions; and
    one or more processors configured to execute the instructions such that the one or more processors are configured to;
    generate a set of optimal flight trajectories for an aircraft for respectively different operating conditions;
    identify and store for coefficients describing the set of optimal flight trajectories including the steps of:
        i) selecting a first optimal flight trajectory from the set of optimal flight trajectories,
        ii) identifying, using a mathematical curve fitting technique on the selected first optimal flight trajectory, and storing a set of first coefficients that describes the selected first optimal flight trajectory, and
        iii) repeating steps (i) and (ii) for different optimal flight trajectories from the set of optimal flight trajectories, to create and store multiple sets of first coefficients;
    calculating multiple sets of second coefficients describing a variation of the first coefficients with operating conditions of the aircraft, including the steps of:
        i. selecting the first coefficient of each stored set of first coefficients,
        ii. identifying, using a mathematical curve or surface fitting technique on the selected first coefficients, and storing a set of second coefficients that describes the variation of first coefficients with operating conditions of the aircraft, and
        iii. repeating steps (i) and (ii) for the second coefficient of each stored set of first coefficients to create and store a second set of second coefficients, and iv. repeating steps i. and ii. for the remaining coefficients of each stored set of first coefficients, to create and store multiple sets of second coefficients;

and generate a preferred flight trajectory for the aircraft based on the multiple sets of coefficients.

13. The system of claim 12, further comprising:

a user input device; and a display operatively connected to the user input device, the memory and the one or more processors, wherein the one or more processors are further configured to display the generated preferred flight trajectory on the display.

14. The system of claim 12, further comprising one or a plurality of datalinks.

15. The system of claim 14, wherein the one or the plurality of datalinks is a wireless data link.

16. The system of claim 12, wherein the one or more processors is configured to communicate with control and guidance systems of the aircraft.

17. The system of claim 12, wherein the one or more processors includes a first processor configured to define the set of first functions that describe the at least one optimal trajectory and calculating and storing the set of first coefficients describing the first set of functions;

define the set of second functions that describe the variation of the set of first coefficients with operating conditions;

calculate and store the set of second coefficients that describe the set of second functions;

and a second processor configured to generate the preferred flight trajectory for the aircraft based on the set of second coefficients to determine the preferred flight trajectory; and implement the preferred flight trajectory on the aircraft by entering the preferred flight trajectory into aircraft control systems.

\* \* \* \* \*